(12) United States Patent
Lin

(10) Patent No.: US 9,797,546 B1
(45) Date of Patent: Oct. 24, 2017

(54) PIVOTAL DEVICE FOR A SUPPORT OF AN ELECTRIC DEVICE

(71) Applicant: Leohab Enterprise Co., Ltd., Taichung (TW)

(72) Inventor: Chao-Chi Lin, Taichung (TW)

(73) Assignee: LEOHAB ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 15/361,192

(22) Filed: Nov. 25, 2016

(30) Foreign Application Priority Data

Aug. 9, 2016 (TW) .............................. 105212046

(51) Int. Cl.
| | |
|---|---|
| *F16M 11/10* | (2006.01) |
| *F16M 11/04* | (2006.01) |
| *F16M 13/00* | (2006.01) |
| *A47F 5/02* | (2006.01) |
| *A47B 23/04* | (2006.01) |
| *G06F 1/16* | (2006.01) |

(52) U.S. Cl.
CPC ............. *F16M 13/00* (2013.01); *A47B 23/04* (2013.01); *F16M 11/04* (2013.01); *F16M 11/10* (2013.01); *G06F 1/1601* (2013.01); *G06F 1/1681* (2013.01)

(58) Field of Classification Search
CPC ...... F16M 13/00; F16M 11/00; G06F 1/1681; A47B 23/04
USPC ........ 248/447, 371, 346.06, 349.1, 919, 133
See application file for complete search history.

(56) References Cited

U.S. PATENT DOCUMENTS

| | | | | |
|---|---|---|---|---|
| 6,227,518 | B1* | 5/2001 | Sun ........................ | F16M 11/10 248/371 |
| 6,351,535 | B1* | 2/2002 | Nogas ..................... | H04M 1/12 379/435 |
| 7,466,820 | B2* | 12/2008 | Lee ........................ | F16M 11/10 248/919 |
| 8,708,298 | B2* | 4/2014 | Hu ....................... | F16M 11/041 248/371 |
| 9,341,305 | B2* | 5/2016 | Yeh ........................ | F16M 11/38 |
| 9,404,298 | B1* | 8/2016 | Chen ..................... | G06F 1/1681 |
| 9,518,414 | B1* | 12/2016 | Chen ..................... | G06F 1/1681 |

* cited by examiner

*Primary Examiner* — Tan Le
(74) *Attorney, Agent, or Firm* — Muncy, Geissler, Olds & Lowe, P.C.

(57) ABSTRACT

A pivotal device for a support of an electric device includes a base and a flip module. The base includes a compartment. At least one first track is disposed in the compartment and is arcuate. At least one friction device is coupled to and movable relative to the base. The flip module includes a first sliding member and a second sliding member. The first sliding member is received in the compartment and is movable relative to the base along a contour of the at least one first track. The at least one friction device abuts the first sliding member. The first sliding member includes a second track. The second track is arcuate. The second sliding member is coupled to the first sliding member and is movable relative to the first sliding member along a contour of the second track.

7 Claims, 7 Drawing Sheets

PIVOTAL DEVICE FOR A SUPPORT OF AN ELECTRIC DEVICE

BACKGROUND OF THE INVENTION

The present invention relates to a pivotal device and, more particularly, to a pivotal device for a support of an electric device.

Due to flourishing development of the electronic industry, more and more users are familiar with electronic devices, such as tablet computers, for entertainment or business. During use, a user generally holds left and right sides of an electronic device of this type with two hands which are apt to feel tired. More tablet computers have increased screen sizes for seeing films and are, thus, heavier, further aggravating the tiredness of the hands or even causing pain. Although some of the electronic devices can be placed flat on the lap of the user or on a table, it is inconvenient for the user in watching the screen and in operation.

Thus, a need exists for a novel pivotal device for a support of an electric device to mitigate and/or obviate the above disadvantages.

BRIEF SUMMARY OF THE INVENTION

A pivotal device for a support of an electric device according to the present invention includes a base and a flip module. The base includes a compartment. At least one first track is disposed in the compartment and is arcuate. At least one friction device is coupled to and movable relative to the base. The flip module includes a first sliding member and a second sliding member. The first sliding member is received in the compartment and is movable relative to the base along a contour of the at least one first track. The at least one friction device abuts the first sliding member. The first sliding member includes a second track. The second track is arcuate. The second sliding member is coupled to the first sliding member and is movable relative to the first sliding member along a contour of the second track.

In an example, the base includes a first side and a second side opposite to the first side. The first and second sides are located on opposite sides of the compartment. A bracket is mounted to the second side of the base. The at least one friction device is coupled to the bracket and is movable relative to the base. The second sliding member includes a first end having a sliding portion and a second end having a connecting portion opposite to the sliding portion. The sliding portion of the second sliding member is disposed in the second track. The connecting portion extends beyond the compartment via the second side of the base.

In an example, the bracket is securely connected to the base via a fastener, and the fastener is connected to the base by screwing.

In an example, the at least one friction device includes an adjusting member and a friction member. The adjusting member is coupled to the bracket and is movable relative to the base. The friction member is mounted to an end of the adjusting member adjacent to the at least one first track. The friction member and the adjusting member are jointly movable. The friction member abuts the first sliding member.

In an example, the adjusting member is connected to the bracket by screwing.

In an example, the at least one friction device includes an elastic device mounted between the adjusting member and the friction member, and the elastic device includes a first end securely connected to the adjusting member and a second end securely connected to the friction member.

In an example, the base includes two sidewalls parallel to each other. The two sidewalls are located on two opposite sides of the compartment and are located between the first side and the second side. The at least one first track includes two first tracks. Each of the two first tracks is disposed on a side of one of the two sidewalls adjacent to the compartment. The two first tracks face each other. Each of the two first tracks is a groove. The at least one friction device includes two friction devices respectively abutting two portions of the first sliding member adjacent to the two first tracks. The first sliding member includes two first sliding lips respectively on two opposite sides thereof. The two first sliding lips are respectively and slideably received in the two first tracks and are arcuate. The second track is located between the two opposite sides of the first sliding member.

In an example, the first sliding member includes a limiting protrusion protruding into the second track. The second sliding member further includes a limiting groove recessed in the sliding portion. The limiting protrusion of the first sliding member extends into the limiting groove of the second sliding member.

In an example, the first sliding member further includes a carrier portion adjacent to an end of the second track. The second sliding member further includes a stopper portion between the sliding portion and the connecting portion. The flip module further includes an elastic member having a first end pressing against the carrier portion of the first sliding member and a second end abutting the stopper portion for pressing against the second sliding member.

The present invention will become clearer in light of the following detailed description of illustrative embodiments of this invention described in connection with the drawings.

DETAILED DESCRIPTION OF THE INVENTION

Figure 1:
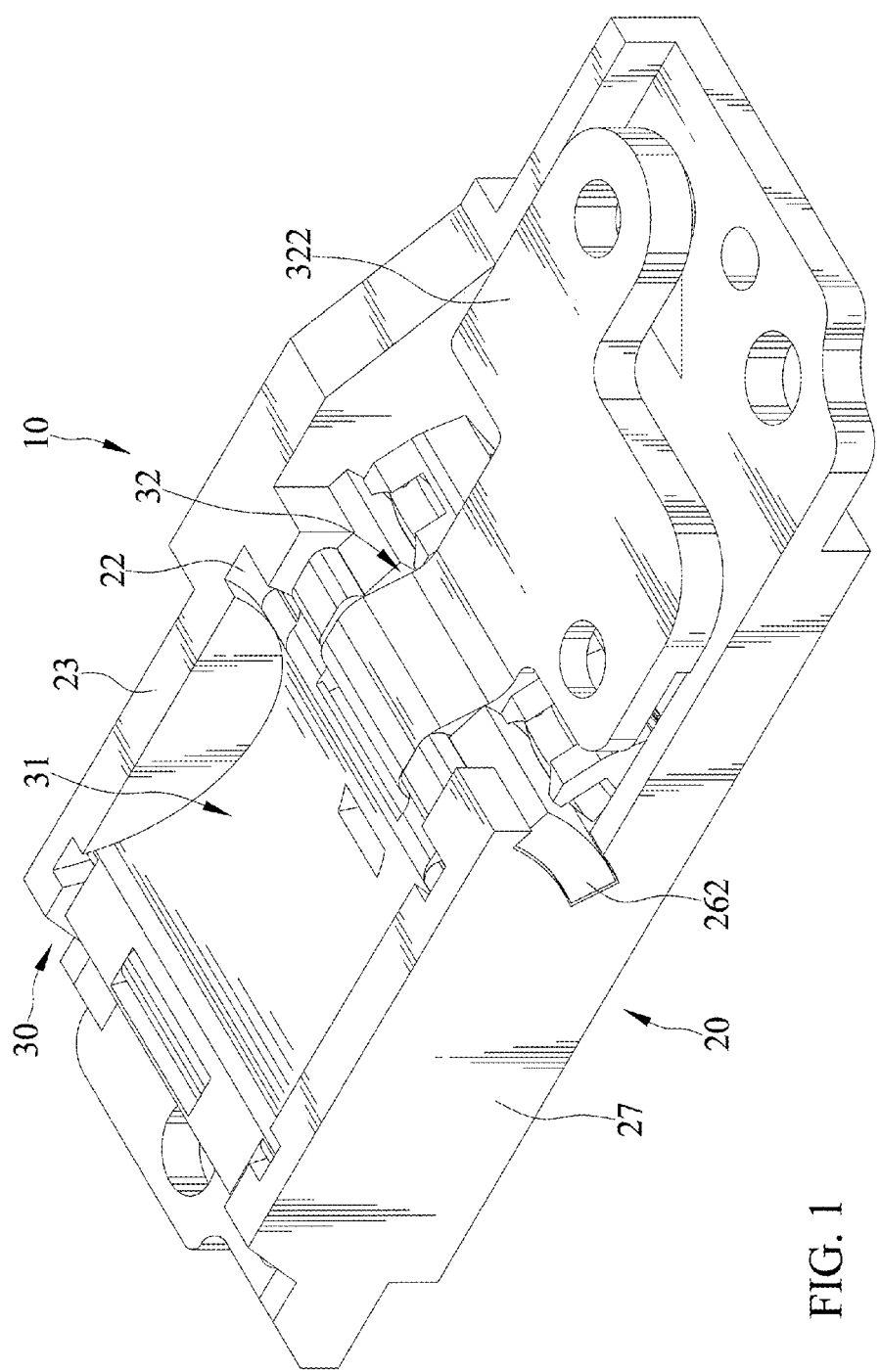
FIG. 1 is a perspective view of a pivotal device for a support of an electric device according to the present invention.
Figure 2:
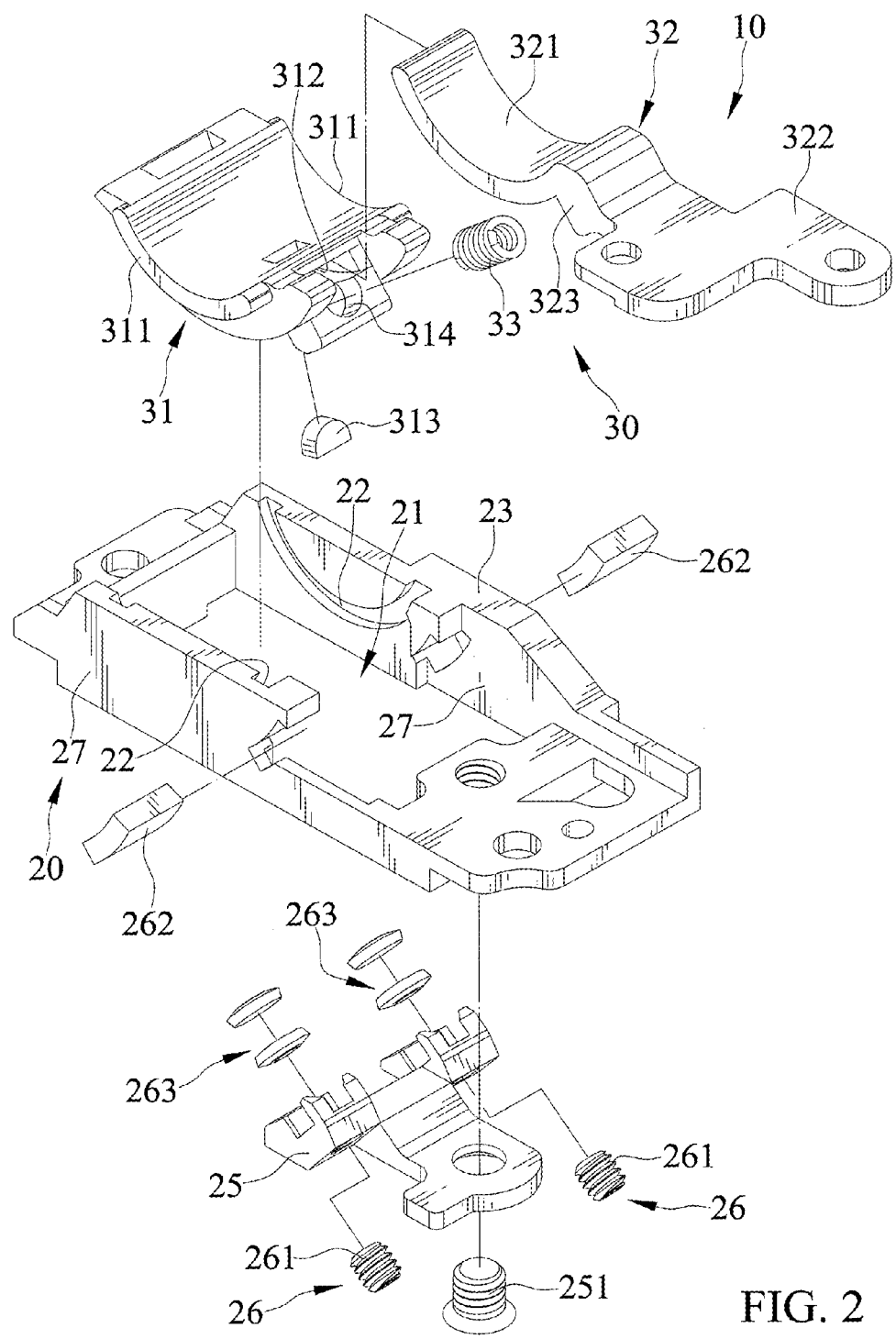
FIG. 2 is an exploded, perspective view of the pivotal device of FIG. 1.
Figure 3:
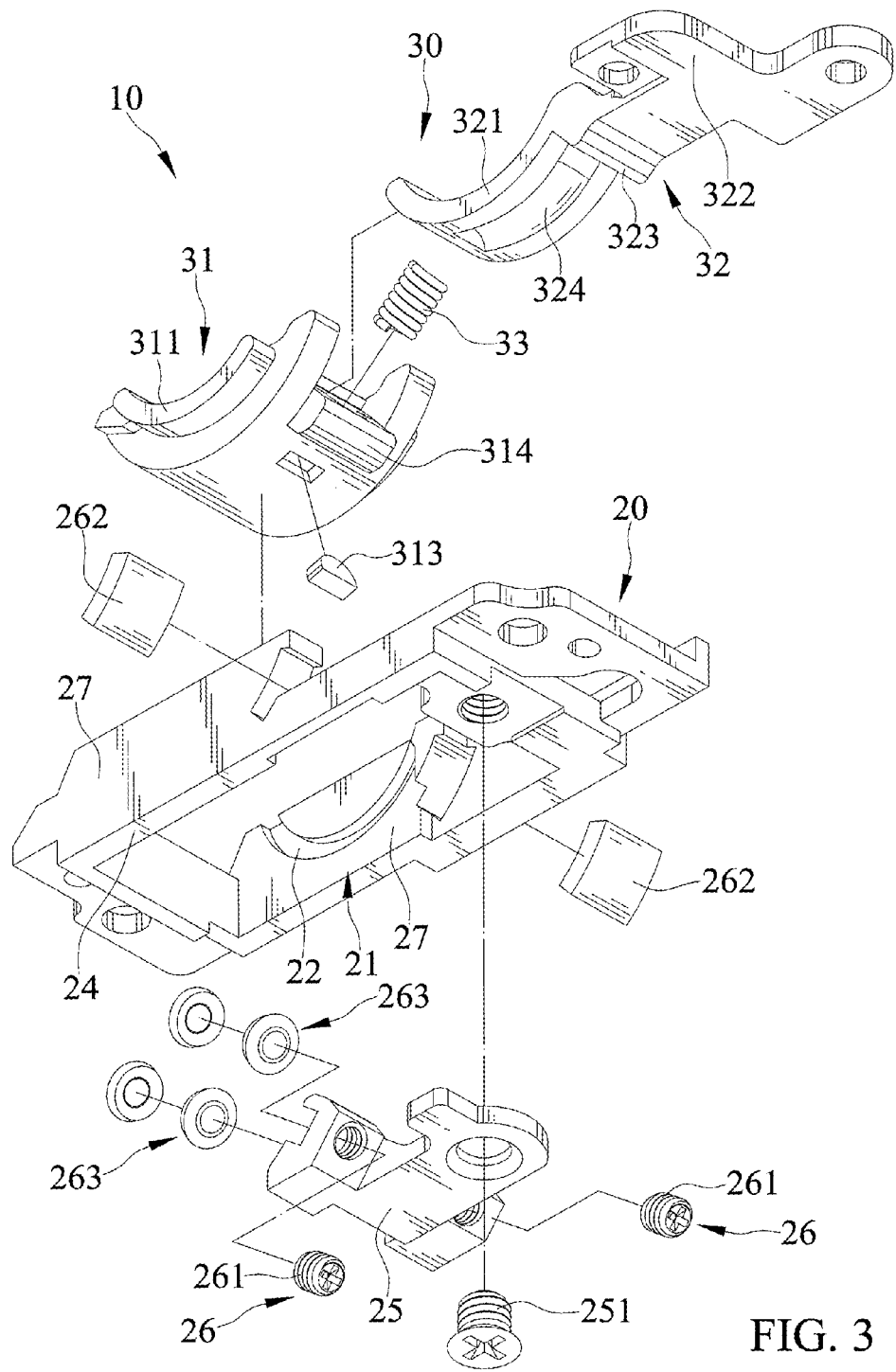
FIG. 3 is another exploded, perspective view of the pivotal device of FIG. 1.

With reference to FIGS. 1-3, a pivotal device 10 for a support of an electric device according to the present invention includes a base 20 and a flip module 30. The base 20 includes a compartment 21. At least one first track 22 is disposed in the compartment 21 and is arcuate. The base 20 includes a first side 23 and a second side 24 opposite to the first side 23. The first and second sides 23 and 24 are located on opposite sides of the compartment 21. A bracket 25 is mounted to the second side 24 of the base 20. The bracket 25 is securely connected to the base 20 via a fastener 251. The fastener 251 is connected to the base 20 by screwing.

Figure 4:
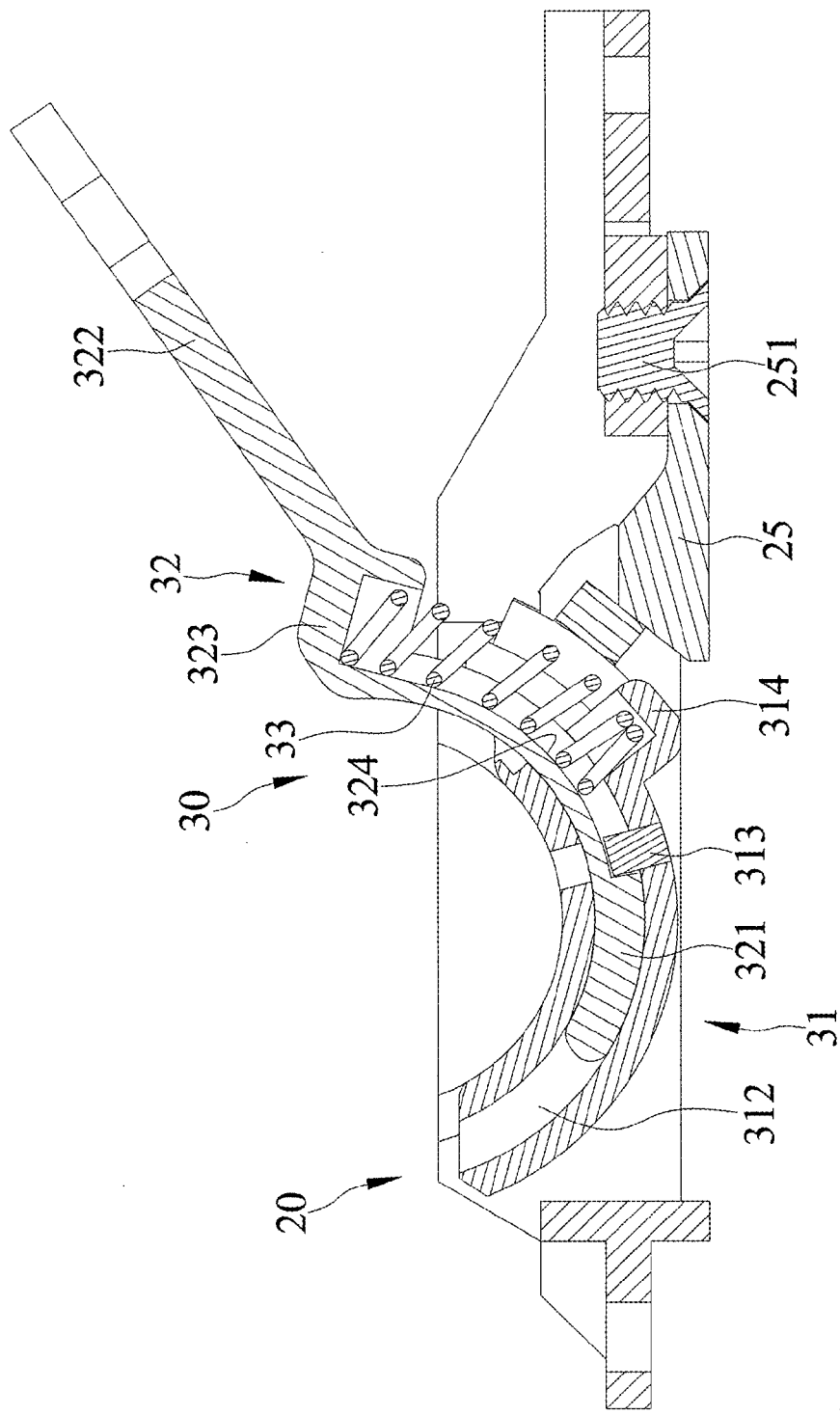
FIG. 4 is a cross sectional view of the pivotal device of FIG. 1.
Figure 5:
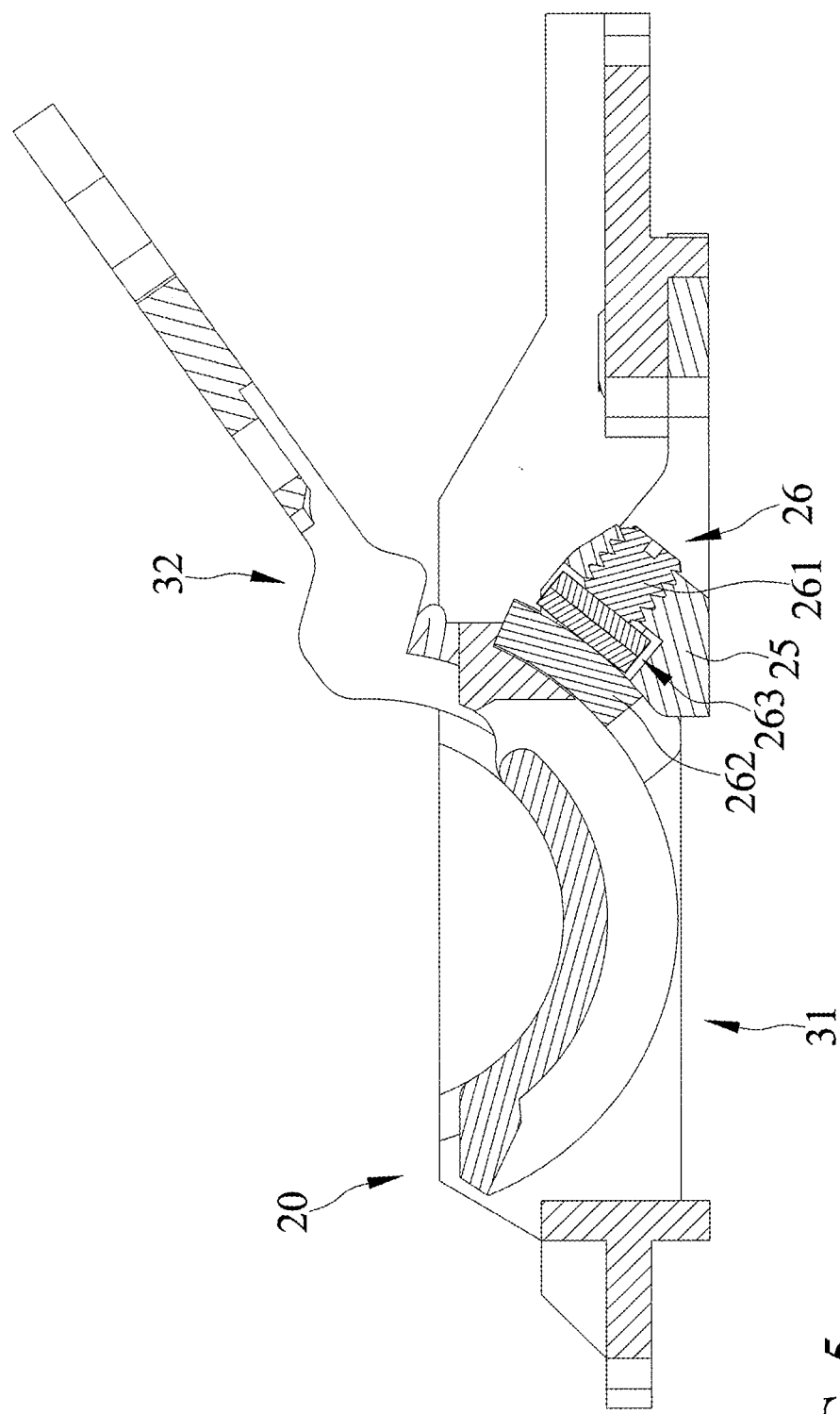
FIG. 5 is another cross sectional view of the pivotal device of FIG. 1.

With reference to FIGS. 4 and 5, at least one friction device 26 is coupled to and movable relative to the base 20.

The at least one friction device 26 is coupled to the bracket 25 and is movable relative to the base 20. The at least one friction device 26 includes an adjusting member 261, a friction member 262, and an elastic device 263. The adjusting member 261 is coupled to the bracket 25 and is movable relative to the base 20. In this embodiment, the adjusting member 261 is connected to the bracket 25 by screwing. The friction member 262 is mounted to an end of the adjusting member 261 adjacent to the at least one first track 22, such that the friction member 262 and the adjusting member 261 are jointly movable. The elastic device 263 is mounted between the adjusting member 261 and the friction member 262. The elastic device 263 includes a first end securely connected to the adjusting member 261 and a second end securely connected to the friction member 262.

The base 20 further includes two sidewalls 27 parallel to each other. The two sidewalls 27 are located on two opposite sides of the compartment 21 and are located between the first side 23 and the second side 24. In this embodiment, the base 20 includes two first tracks 22. Each of the two first tracks 22 is disposed on a side of one of the two sidewalls 27 adjacent to the compartment 21. The two first tracks 22 face each other. Each of the two first tracks 22 is a groove.

The flip module 30 includes a first sliding member 31 and a second sliding member 32. The first sliding member 31 is received in the compartment 21 and is movable relative to the base 20 along a contour of each first track 22. The at least one friction device 26 abuts the first sliding member 31. In this embodiment, the base 20 includes two friction devices 26 respectively abutting two portions of the first sliding member 31 adjacent to the two first tracks 22.

The first sliding member 31 includes two first sliding lips 311 respectively on two opposite sides thereof. A second track 312 is located between the two opposite sides of the first sliding member 31. The two first sliding lips 311 are respectively and slideably received in the two first tracks 22 and are arcuate. The second track 312 is arcuate. The first sliding member 31 further includes a limiting protrusion 313 protruding into the second track 312. The first sliding member 31 further includes a carrier portion 314 adjacent to an end of the second track 312.

The second sliding member 32 is coupled to the first sliding member 31 and is movable relative to the first sliding member 31 along a contour of the second track 312. The second sliding member 32 includes a first end having a sliding portion 321 and a second end having a connecting portion 322 opposite to the sliding portion 321. The second sliding member 32 further includes a stopper portion 323 between the sliding portion 321 and the connecting portion 322. The sliding portion 321 of the second sliding member 32 is disposed in the second track 312. The second sliding member 32 further includes a limiting groove 324 recessed in the sliding portion 321. The limiting protrusion 313 of the first sliding member 31 extends into the limiting groove 324 of the second sliding member 32. The connecting portion 322 extending beyond the compartment 21 via the second side 24 of the base 20.

The flip module 30 further includes an elastic member 33 having a first end pressing against the carrier portion 314 of the first sliding member 31 and a second end abutting the stopper portion 323 for pressing against the second sliding member 32.

Figure 6:
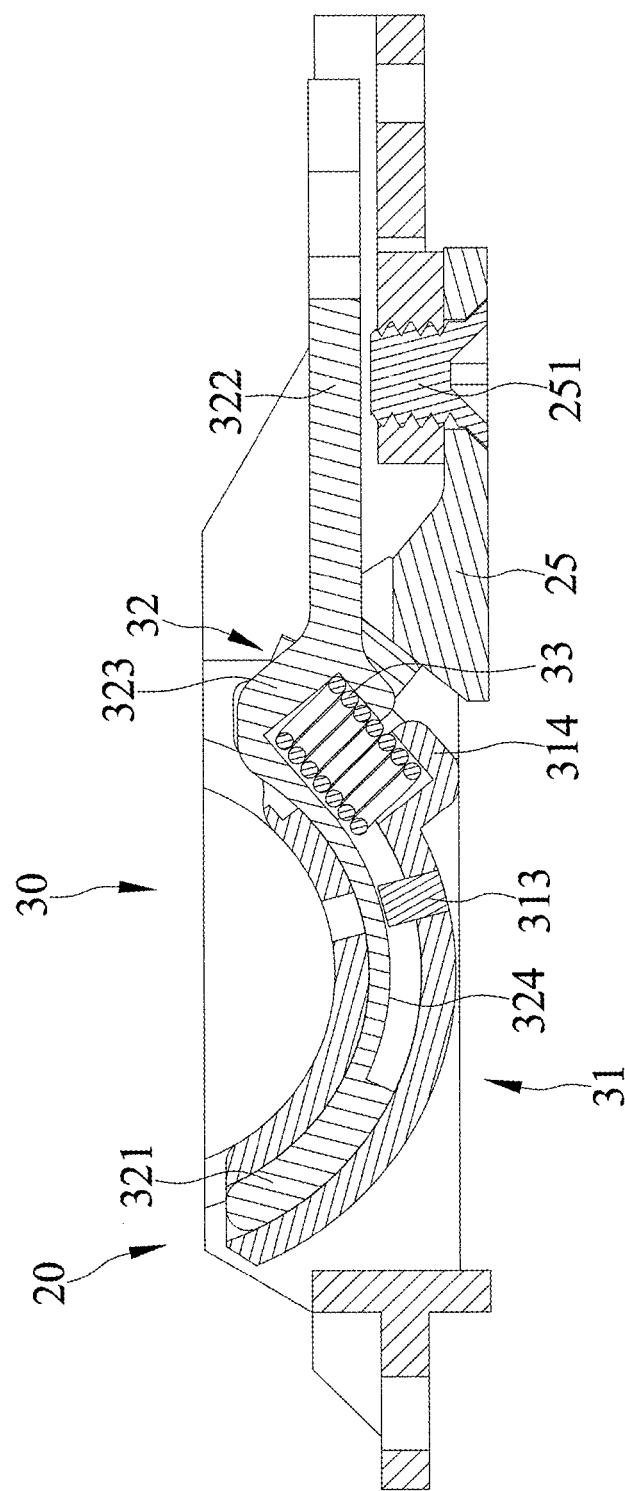
FIG. 6 is a view similar to FIG. 4, illustrating use of the pivotal device after the pivotal device is closed.
Figure 7:
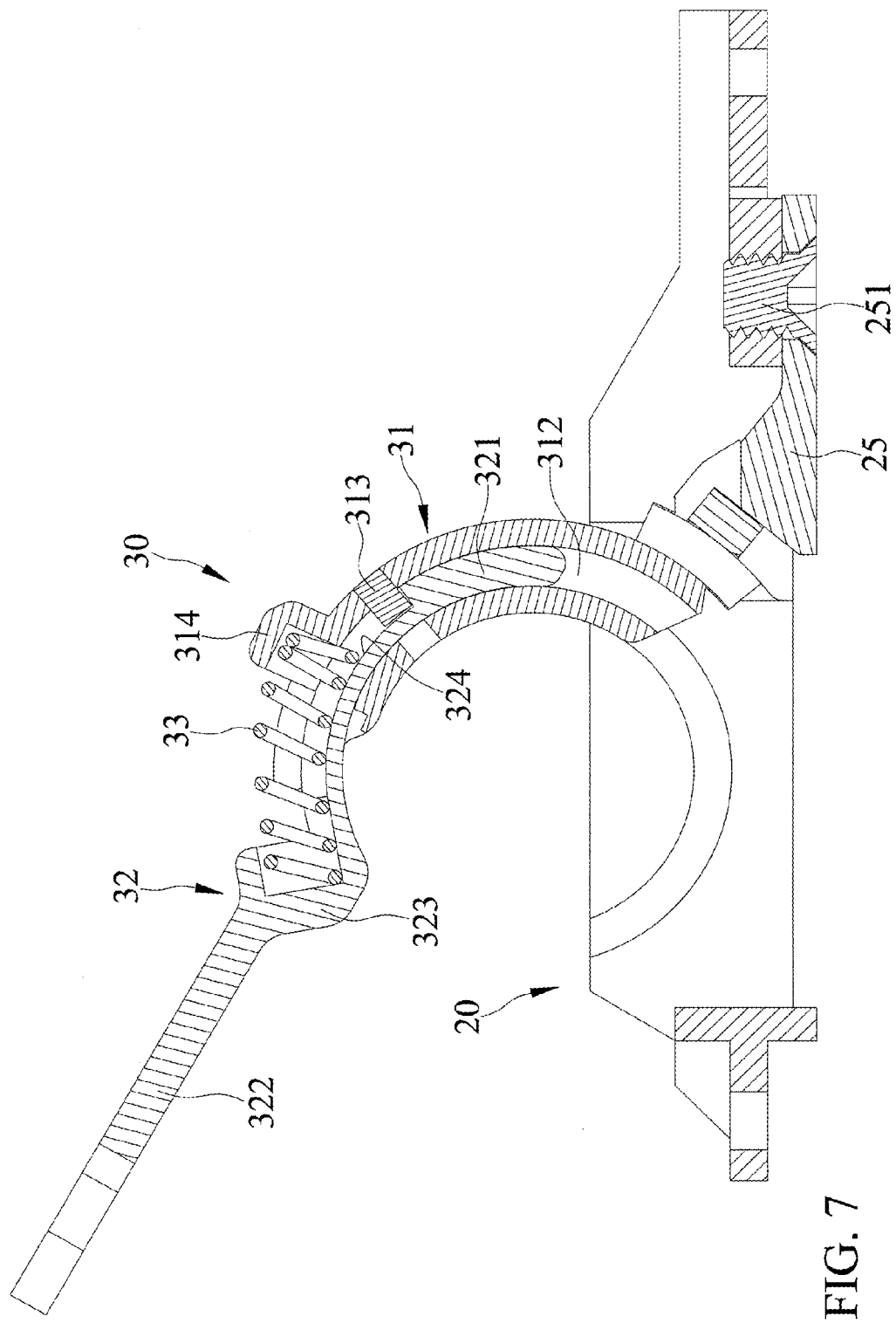
FIG. 7 is a view similar to FIG. 4, illustrating use of the pivotal device after the pivotal device is extended.

With reference to FIGS. 6 and 7, the base 20 can be connected to a body of an electronic device or a body of a support of an electronic device. The second sliding member 32 of the flip module 30 can be connected to a foot stand. When the pivotal device 10 is in an original position, the elastic element 33 presses against and, thus, moves the second sliding member 32, such that the flip module 30 automatically extends to a position at an angle of 35°-50° to the base 20 (see FIG. 4). Furthermore, the friction member 262 is moved by rotating the adjusting member 261, and the force pressing the first sliding member 31 from the friction member 262 is changed, achieving adjustment of the resistant force during movement of the first sliding member 31.

A user can push the flip module 30 to decrease the angle between the flip module 30 and the base 20. The angular relationship between the flip module 30 and the base 20 can be fixed in the 0° position (see FIG. 6) by a fixing structure between the foot stand and the body of the support of the electronic device. Furthermore, the user can manually adjust the angle of the flip module 30 by pushing the second sliding member 32 to actuate the first sliding member 31 to move relative to the base 20. The maximum extended angle between the flip module 30 and the base 20 can be in a range between 145° and 165° (see FIG. 7).

In view of the foregoing, the pivotal device 10 for a support of an electronic device according to the present invention includes a base 20 and a flip module 30. The base 20 includes a compartment 21. At least one first track 22 is disposed in the compartment 21 and is arcuate. The base 20 includes at least one friction device 26 coupled to and movable relative to the base 20. The flip module 30 includes a first sliding member 31 and a second sliding member 32. The first sliding member 31 is received in the compartment 21 and is slideable relative to the base 20 along a contour of the at least one first track 22. The at least one friction device 26 abuts the first sliding member 31. The first sliding member 31 includes a second track 312 that is arcuate. The second sliding member 32 is coupled to the first sliding member 31 and is movable relative to the first sliding member 31 along a contour of the second track 312. By providing such a pivotal device 10, the resistant force during movement of the flip module 30 can be adjusted.

Although specific embodiments have been illustrated and described, numerous modifications and variations are still possible without departing from the scope of the invention. The scope of the invention is limited by the accompanying claims.

The invention claimed is:

1. A pivotal device for a support of an electric device, comprising:

a base including a compartment, with at least one first track disposed in the compartment and being arcuate, and with at least one friction device coupled to and movable relative to the base; and a flip module including a first sliding member and a second sliding member, with the first sliding member received in the compartment and movable relative to the base along a contour of the at least one first track, with the at least one friction device abutting the first sliding member, with the first sliding member including a second track, with the second track being arcuate, and with the second sliding member coupled to the first sliding member and movable relative to the first sliding member along a contour of the second track;

the base including a first side and a second side opposite to the first side, with the first and second sides located on opposite sides of the compartment, with a bracket mounted to the second side of the base, with the at least one friction device coupled to the bracket and movable relative to the base, with the second sliding member including a first end having a sliding portion and a second end having a connecting portion opposite to the sliding portion, with the sliding portion of the second sliding member disposed in the second track, and with the connecting portion extending beyond the compartment via the second side of the base;

the at least one friction device including an adjusting member and a friction member, with the adjusting member coupled to the bracket and movable relative to the base, with the friction member mounted to an end of the adjusting member adjacent to the at least one first track, with the friction member and the adjusting member being jointly movable, and with the friction member abutting the first sliding member.

2. The pivotal device for a support of an electric device as claimed in claim 1, with the bracket securely connected to the base via a fastener, and with the fastener connected to the base by screwing.

3. The pivotal device for a support of an electric device as claimed in claim 1, wherein the adjusting member is connected to the bracket by screwing.

4. The pivotal device for a support of an electric device as claimed in claim 1, with the at least one friction device including an elastic device mounted between the adjusting member and the friction member, and with the elastic device including a first end securely connected to the adjusting member and a second end securely connected to the friction member.

5. A pivotal device for a support of an electric device, comprising:
a base including a compartment, with at least one first track disposed in the compartment and being arcuate, and with at least one friction device coupled to and movable relative to the base; and
a flip module including a first sliding member and a second sliding member, with the first sliding member received in the compartment and movable relative to the base along a contour of the at least one first track, with the at least one friction device abutting the first sliding member, with the first sliding member including a second track, with the second track being arcuate, and with the second sliding member coupled to the first sliding member and movable relative to the first sliding member along a contour of the second track;
the base including a first side and a second side opposite to the first side, with the first and second sides located on opposite sides of the compartment, with a bracket mounted to the second side of the base, with the at least one friction device coupled to the bracket and movable relative to the base, with the second sliding member including a first end having a sliding portion and a second end having a connecting portion opposite to the sliding portion, with the sliding portion of the second sliding member disposed in the second track, and with the connecting portion extending beyond the compartment via the second side of the base;
the base including two sidewalls parallel to each other, with the two sidewalls located on two opposite sides of the compartment and located between the first side and the second side, with the at least one first track including two first tracks, with each of the two first tracks disposed on a side of one of the two sidewalls adjacent to the compartment, with the two first tracks facing each other, with each of the two first tracks being a groove, with the at least one friction device including two friction devices respectively abutting two portions of the first sliding member adjacent to the two first tracks, with the first sliding member including two first sliding lips respectively on two opposite sides thereof, with the two first sliding lips respectively and slideably received in the two first tracks and being arcuate, and with the second track located between the two opposite sides of the first sliding member.

6. The pivotal device for a support of an electric device as claimed in claim 5, with the first sliding member including a limiting protrusion protruding into the second track, with the second sliding member further including a limiting groove recessed in the sliding portion, and with the limiting protrusion of the first sliding member extending into the limiting groove of the second sliding member.

7. The pivotal device for a support of an electric device as claimed in claim 5, with the first sliding member further including a carrier portion adjacent to an end of the second track, with the second sliding member further including a stopper portion between the sliding portion and the connecting portion, with the flip module further including an elastic member having a first end pressing against the carrier portion of the first sliding member and a second end abutting the stopper portion for pressing against the second sliding member.

* * * * *